Oct. 12, 1954 W. A. RAY 2,691,705
SAFETY CONTROL SYSTEM FOR FUEL BURNERS
Original Filed July 5, 1947 2 Sheets-Sheet 1
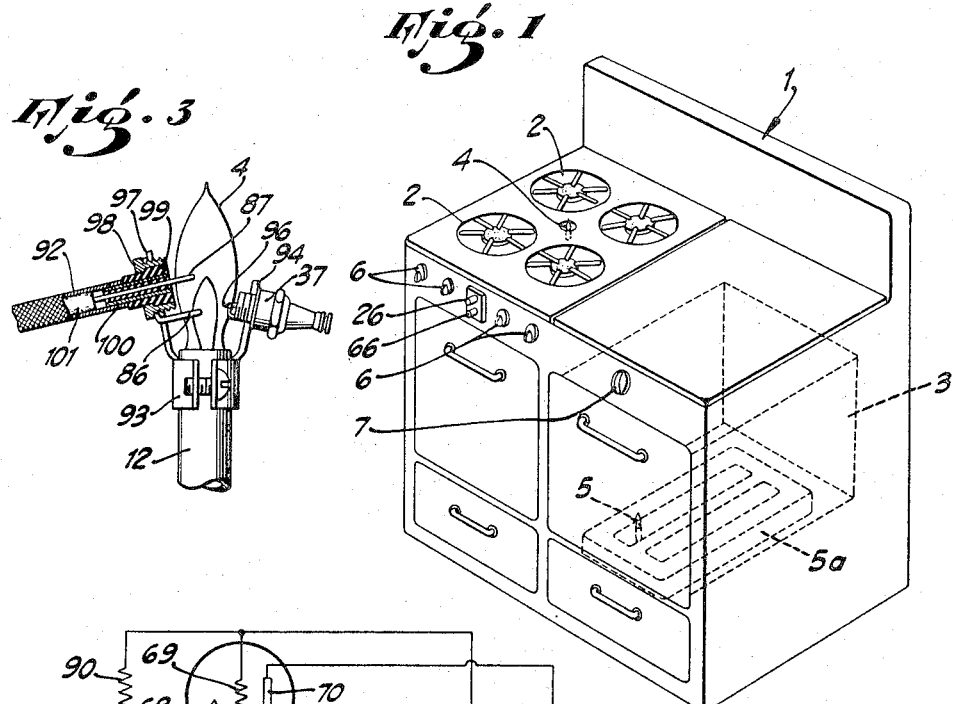
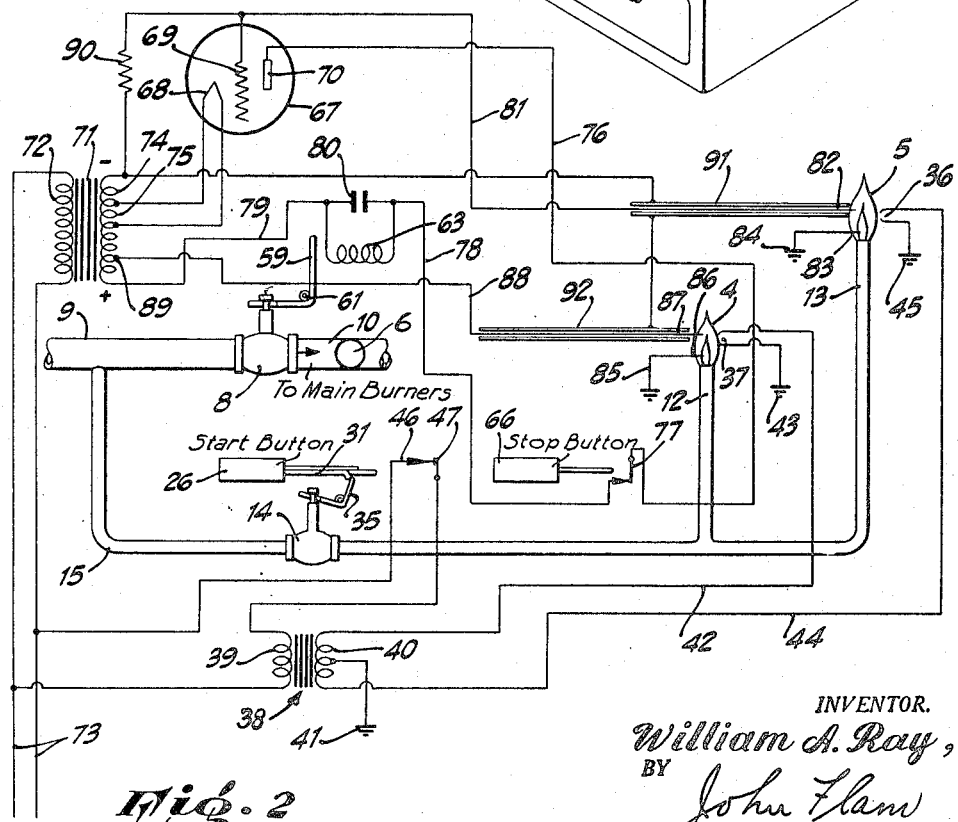
INVENTOR.
William A. Ray,
BY
John Flam
ATTORNEY.

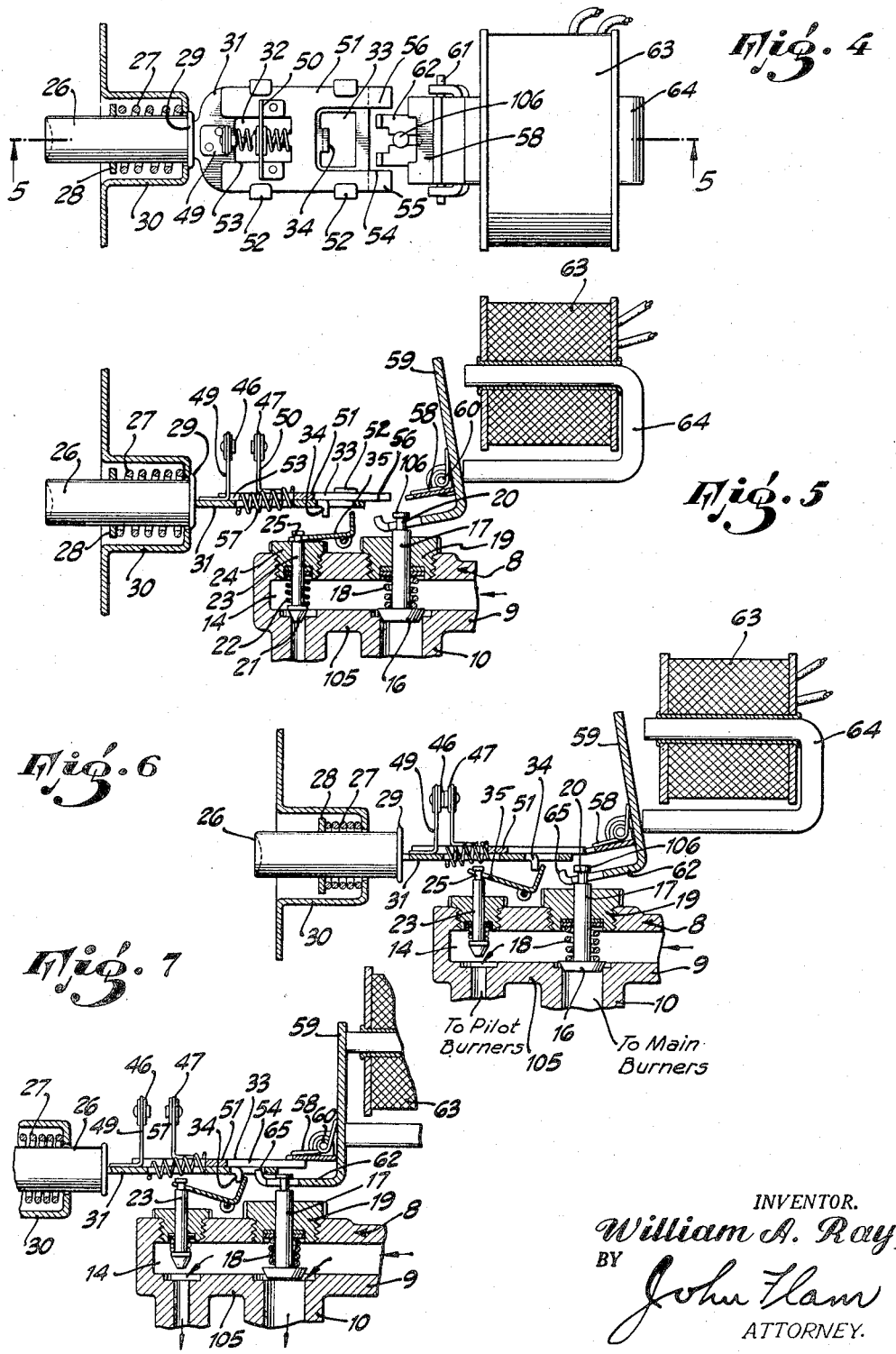

Patented Oct. 12, 1954

2,691,705

UNITED STATES PATENT OFFICE 2,691,705

SAFETY CONTROL SYSTEM FOR FUEL BURNERS

William A. Ray, North Hollywood, Calif., assignor to General Controls Co., a corporation of California Original application July 5, 1947, Serial No. 759,034, now Patent No. 2,533,625, dated December 12, 1950. Divided and this application September 11, 1950, Serial No. 184,143

15 Claims. (Cl. 200—61.86)

This invention relates to a valve mechanism for use in a system for controlling one or more fuel burners, such as the gas burners of a kitchen range, or of a gas heated clothes drier or the like.

This application is a division of an application, filed July 5, 1947, under Ser. No. 759,034, in the name of William A. Ray, assigned to General Controls Co. of Glendale, California, and entitled Safety Control System for Fuel Burners, now Patent No. 2,533,625, issued December 12, 1950.

It is an object of this invention to provide a valve mechanism whereby the pilots remain extinguished until it is desired to ignite the corresponding burner or burners, so that no fuel is used or heat generated while the system is inactive.

It is another object of this invention to provide a novel combination pilot burner and safety burner valve that are so interlocked that the desired safety features are secured.

It is another object of this invention to provide novel means for effecting the operation of such a valve, in the form of a push button, whereby the operation of the system may be initiated by a single operation, and wherein the desired safety features automatically condition the operation thereof.

It is still another object of this invention to provide circuit controlling means cooperating with the valve structure and that is especially useful for energizing an igniter for the pilot burner. It is yet another object of this invention to provide means dependent upon the closed position of the safety valve for conditioning the circuit controller for operation by the push button.

It is still another object of this invention to provide a simple integrated valve system that secures the desired control and safety functions.

This invention possesses many other advantages, and has other objects which may be made more clearly apparent from a consideration of one embodiment of the invention. For this purpose there is shown a form in the drawings accompanying and forming part of the present specification. The form will now be described in detail, illustrating the general principles of the invention; but it is to be understood that this detailed description is not to be taken in a limiting sense, since the scope of this invention is best defined by the appended claims.

Referring to the drawings:

Figure 1 is a pictorial view, mainly diagrammatic, of a kitchen range in which the system of the invention is employed;

Fig. 2 is a wiring diagram of a system embodying the invention;

Fig. 3 is an enlarged view of one of the pilot burners and its associated electrodes;

Fig. 4 is a plan view of the control mechanism utilized in connection with the system;

Fig. 5 is a sectional view, taken along a plane corresponding to line 5—5 of Fig. 4;

Fig. 6 is a view similar to Fig. 5, but illustrating another stage of operation of the control mechanism; and Fig. 7 is a view similar to Fig. 5, but showing a further stage of operation.

Although, in the present instance, a kitchen range 1 is illustrated in Fig. 1, the invention may be embodied in other types of apparatus in which liquid or gaseous fuel burners are utilized.

In the present instance, top burners 2 are illustrated, as well as an oven 3, the burner of which is not shown. A common pilot light 4 is shown for all of the top burners 2. The flame is arranged in a well understood manner to be conducted by appropriate channels in the top plate for igniting any one or more of the burners 2. Similarly, a pilot flame 5 is indicated diagrammatically for igniting the oven burner 5a. Each of the top burners 2 may be controlled by individual manually operable burner valves 6, and the oven burner may be controlled by a burner valve 7. Only the control handles for these burners are shown, since these are well known and require no further explanation. They may be adjusted manually or otherwise to obtain the desired degree of heating.

A safety valve 8 (Figs. 2, 5, 6, and 7) is interposed between the source of fuel, and all of the burners, including the oven burner. Thus, the conduit 9 leads to an appropriate source of gaseous fuel and connects to the inlet of the valve 8. The outlet conduit 10 is arranged to supply fuel to all of the burners.

The pilot flames 4 and 5 are caused to burn at the outlets of the pilot flame burners 12 and 13 (Fig. 2). These burners 12 and 13 are shown as supplied through a common pilot burner valve 14 located in a conduit 15 leading to the conduit 9.

As shown most clearly in Figs. 5, 6, and 7, the safety valve 8 and the pilot burner valve 14 may be housed integrally in a common casing 105.

The safety valve 8 is shown as including a closure 16 mounted on an axially movable stem 17. The closure member 16 is urged or biased toward its seat, as by the aid of a compression spring 18, to interrupt the flow of fuel to the burners. The stem 17 is shown as appropriately guided through a sealing nut 19, and has a reduced neck 20 extending above the casing 105, and terminates in a collar 106.

The pilot valve structure 14 is quite similar to that of the safety valve structure. It is provided with a closure member 21 biased to closing position by a compression spring 22. The closure member 21 is mounted on an axially movable stem 23 guided in the sealing nut 24. It, too, has a neck portion 25 for moving the stem.

The arrangement is such that, when a start button 26 is urged inwardly the pilot burner valve 14 is opened, and igniters such as spark producers 36, 37 (Figs. 2 and 3) for both of the pilot burners are energized electrically. This start button 26 may be appropriately guided adjacent the front of the range 1 and is shown as biased to inactive position by a compression spring 27. This compression spring urges the button 26 toward the left, as viewed in Figs. 4, 5, and 6, as by engaging the right-hand side of a collar 28 attached to the button 26. The button 26 may have a corresponding collar 29 limiting movement of the button to the left. The right-hand end of the spring engages the interior wall of a shell 30 formed to receive the button.

The button 26 carries a movable member 31 which is urged toward the right as the button 26 is moved to the right. This movable member 31 is shown as a flat plate (Figs. 4, 5, 6, and 7). It is provided with apertures 32 and 33. Depending from the left-hand edge of the right-hand aperture 33 is an operating member or actuator 34. This operating member 34, when the button 26 is pressed inwardly, serves to engage one arm of a bell crank lever 35. The other arm of the bell crank lever is engaged around the neck 25. Clockwise rotation of the bell crank lever 35 by inward movement of the member 31 thus serves to lift the valve stem 23 against the force of spring 22, and the pilot burners 12 and 13 are supplied with fuel. This position is shown in Fig. 6.

At the same time, an ignition circuit is closed to ignite the burners 12 and 13 and to cause the flames 4 and 5 to be in existence. Igniters 36 and 37 for these burners are indicated in Fig. 2, and may be spark generators supplied with electrical energy from a step-up transformer 38. The primary winding 39 of this transformer is controlled in a manner to be hereinafter described. The secondary winding 40 is shown as having a central ground connection 41. When the circuit for primary winding 39 is closed, electrical energy is supplied to the igniter 37 through the following circuit: ground 41, the upper half of winding 40, conductor 42, igniter 37, and ground connection 43. Similarly, the circuit for igniter 36 includes ground connection 41, the lower half of winding 40, connection 44, igniter 36, and ground connection 45.

The circuit for the primary winding 39 is controlled by the aid of a pair of relatively movable contacts 46 and 47 which are caused to be engaged only when the safety valve 8 is closed. For this purpose contact 46 is insulated from and carried by an arm 49 mounted on the upper side of movable member 31. The contact 47 is similarly mounted on an arm 50 which is supported on another member 51. This member 51 is arranged on top of the member 31 and is movable therewith. Member 51 is guided for this movement by ears 52 formed on the edges of the member 31. Member 51 is provided with slots 53 and 54 at its opposite edges. Slot 54 thus forms the end projections 55 and 56, shown most clearly in Fig. 4.

The slot 53 serves, with the opening 32, to accommodate a compression spring 57 that is interposed between the members 31 and 51 and appropriately guided thereon. This compression spring 57 urges the contacts 46 and 47 apart. These contacts are normally separated while the system is inactive, as indicated in Fig. 5. The expansion of spring 57 is limited by engagement of the spring with the right-hand edge of aperture 32.

As the member 31 is moved inwardly to open the pilot burner valve 14, the upper member 51 can move in unison therewith unless there be an abutment preventing movement of the member 51. This abutment is effective only while the safety valve 8 is closed. When the abutment is effective, the movement of member 51 is stopped, and the contacts 46 and 47 engage, as in the position of Fig. 6. In this position the igniters 36 and 37 are operated, and the pilot burners 12 and 13 are ignited.

The abutment in this case is in the form of a bar 58 having projections that extend in the path of the projections 55 and 56 of the member 51. This bar 58 is shown as supported upon a bell crank lever 59 which is urged in a counter-clockwise direction by aid of a coil spring 60. The pivot pin 61 serves to support the lever 59. The lower arm 62 of the lever 59 is slotted to receive the reduced portion 20 of stem 17. Clockwise movement of the lever 59 thus serves to lift the stem 17 and to open the safety valve 8. This position is indicated in Fig. 7.

In the closed position of the safety valve 8, the lever 59 is in such position that the abutment 58 is effective to stop movement of the member 51. Accordingly, as the push button 26 is urged inwardly, movement of contact 47 is stopped, while movement of contact 46 continues; and, ultimately, the contacts close in the position of Fig. 6.

The push button 26 is maintained depressed by the hand of the user for a short period until the pilot burners 12 and 13 are ignited. As soon as the pilot flames 4 and 5 are in existence, the lever 59 is automatically moved in a clockwise direction to the position of Fig. 7, and the abutment 58 moves out of the path of member 51. Accordingly, the compression spring 57 can expand to the position shown in Fig. 7, urging the contact 47 away from contact 46 and de-energizing the igniters. At the same time the safety valve 8 is opened and fuel can then pass to the main burners. The control of the main burner flames can be effected by operation of the burner valves 6 and 7.

In order to move the bell crank lever 59 to the opening position of Fig. 7, use is made of an electromagnet 63 which has a core 64. The lever 59 is made from magnetic material, so that it is attracted to core 64 when coil 63 is energized. Energization of the coil 63 is dependent upon the existence of the pilot flames 4 and 5; and it is only when both of these flames are in existence that coil 63 is energized.

The arm 62 is also provided with an upturned latch 65 that is adapted to engage the right-hand edge of the aperture 33 (Fig. 7). In this position, therefore, the member 31 and push buttons 26 are restrained against movement toward the left. The push button is thus maintained in the active position with the pilot burner valve 14 held open. This is the running position of the system, the contacts 46 and 47 being separated and the pilot burner valve 14 retained in open position by the actuator 34.

To interrupt the supply of fuel to the burners, a stop button 66 (Figs. 1 and 2) may be utilized to interrupt the circuit for the coil 63. Under such circumstances, lever 59 is urged in a counterclockwise direction by spring 60, and the latch 65 releases the member 31. Compression spring 27 returns the button 26 to the inactive position of Fig. 5.

The control circuit for the coil 63 includes the thermionic emission device 67 (Fig. 2). This thermionic emission device is shown as having a filamentary cathode 68, a control electrode 69, and an anode 70. The electrical energy is supplied to the thermionic device and its associated circuits through a step-up transformer 71. The primary winding 72 is shown as supplied from the mains 73, to which the primary winding 39 of the ignition transformer 38 is also connected. The secondary winding 74 is shown as tapped at several places to supply appropriate voltages to the electrodes of the thermionic device 67. Thus, the filament 68 is supplied through a section 75 of the transformer winding 74.

The output circuit of the device 67 includes plate 70, connection 76, and stop button contacts 77 capable of being operated by pushing the stop button 66. The circuit then continues through a connection 78, coil 63, and connection 79 to the lower terminal of the winding 74. Since current passes throught this circuit only when anode 70 is positive with respect to cathode 68 (corresponding to that portion of the A. C. cycle when the lower terminal winding 74 is positive) the current flowing through this circuit pulsates. To reduce the pulsation, an appropriate capacitance 80 may be connected across the coil 63.

In order that the output current may flow to energize the electromagnet coil 63 and thereby to move the lever 59 to open the safety valve 8, it is necessary that the potential of control electrode 69 be positive with respect to the filament 68. The input circuit including this control electrode comprises connection 81, electrode 82 that extends into the flame 5, another electrode 83 also extending into the flame 5, a ground connection 85, and electrodes 86 and 87 extending into the flame 4. Electrode 87 is connected by the conductor 88 to a point 89 on winding 74 which is positive with respect to the filament 68 when the lower terminal of winding 74 is positive.

In this input circuit, advantage is taken of the conductivity of flames 4 and 5. When either of these flames 4 and 5 is not in existence, an open circuit is produced between the corresponding conductors 82, 83, or 86 and 87, and the control electrode 69 attains a negative potential with respect to the filament 68 through a resistance connection 90. Accordingly, when the input circuit is interrupted by failure of either flame 4 or 5, the electromagnet coil 63 releases the lever 59 to the position of Fig. 5, and the system is shut down.

The potential impressed on electrode 69 by resistor 90 can never cause flow of current through the output circuit since, when the upper terminal of winding 74 is positive (making control electrode 69 positive with respect to the cathode 68), the lower terminal of winding 74 is negative and, therefore, the anode 70 is negative, and no space current can flow to it. It is only when the relative potentials of the winding terminals are as indicated, that the anode 70 is positive; but under such circumstances, the connection to resistor 90 is negative.

When the flames 4 and 5 are in existence, the resistances of the circuits including flames 4 and 5 are such that the control electrode 69 is sufficiently positive, during that one-half cycle in which the lower terminal 74 is positive, to cause flow of an operative current through the anode or output circuit traced hereinabove.

Assurance is provided that, in the event of grounding of any of the electrodes 82 or 87, the circuits are de-energized to return the system to the inactive condition. For this purpose tubular metallic shields 91 and 92 are provided surrounding the conductors 82 and 87 in which these conductors are insulated and supported. The shields are both connected to the upper terminal of winding 74. Accordingly, if either of the electrodes 82 or 87 is grounded, the control electrode 69 would be maintained at a potential negative with respect to the cathode 68.

The manner in which the spark igniters 36 and 37 are supported, as well as the manner in which the shields and electrodes are supported, is shown most clearly in Fig. 3. Thus, the burner 12, which provides the pilot flame 4, is shown as provided with a metal bracket 93. This bracket has an arm 94 in which the spark generator 37, forming the igniter contacts 96, is supported. Another bracket 97 has threaded therein a hollow screw 98. This screw 98 has a head for clamping the electrode 86 in place (thereby grounding it on pilot burner 12). An insulation sleeve 99 passes through screw 98, and is provided with layers of insulation 100 through which the electrode 87 passes. This electrode in turn is connected to an insulated conductor 101 over which the shield 92 is placed.

The mode of operation of the system may now be summarized. In order to start operation of any of the burners 2, or the oven burner, from the inactive position shown in Figs. 4 and 5, any one of the manually operated valves 6, 7 may be opened. No gas flows, since the safety valve 8 is still closed. Now the starting button 26 may be depressed and held in depressed position until the coil 63 is energized, as hereinbefore stated. Depression of the button 26 causes the passage of fuel to the pilot burners 12 and 13 and their ignition by aid of the contacts 46 and 47.

As soon as coil 63 is energized, the lever 59 is attracted to the position of Fig. 7, permitting separation of contacts 46 and 47. This lever also latches the push button in operative position, maintaining the pilot burner valve 14 open. Gas can now flow to those main burners for which the manually operated valves 6 and 7 have been opened, and one or the other of the pilot flames serves to ignite these burners.

When it is desired to shut down the system, stop button 66 is depressed. This causes separation of the contacts 77, coil 63 is de-energized, and the system returns to the position of Fig. 5.

The inventor claims:

1. In a valve mechanism: a valve body having an inlet; means forming a main and a supplemental outlet from said valve body; a movable valve closure for said main outlet; a movable valve closure for said supplemental outlet; a manually movable member for moving said supplemental valve closure to open position; means urging said member away from valve opening position; an operator coupled to said main valve closure for moving said main valve closure to open position; and means dependent upon the opening of said main valve to latch said manually movable member in supplemental valve opening position.

2. In a valve mechanism: a valve body having an inlet; means forming a main and a supplemental outlet from said valve body; a valve closure for said main outlet; a valve closure for said supplemental outlet; a manually movable member having means for moving said supplemental valve closure to open position; an operator coupled to said main valve closure for moving said main valve closure to open position; and a latching projection carried by said operator and engageable with said manually movable member only upon movement of said operator to main valve opening position for mechanically latching said manually movable member in supplemental valve opening position.

3. In a valve interlock system: means forming a main valve having a valve seat; means forming a supplemental valve having a valve seat; a main valve closure; a supplemental valve closure; a manually movable member engageable with said supplemental valve closure for moving said supplemental valve closure to open position; means urging said member away from valve-opening position; an operator coupled to said main valve closure for moving said main valve to open position; and means dependent upon the opening of said main valve to latch said manually movable member in supplemental valve opening position.

4. In a valve mechanism: means forming a main valve having a valve seat; means forming a supplemental valve having a valve seat; a closure for the main valve seat; a closure for the supplemental valve seat; a movable member coupled to said main valve closure for moving said main valve closure to open position; electromagnetic means having a magnetic element moved by said electromagnetic means, when energized, and connected to said movable member for moving the main valve closure; a manually movable operator engageable with said supplemental valve closure for moving said supplemental valve closure to open position; means urging said operator away from valve-opening position; and a pair of latching members carried respectively by said operator and said movable member for latching said operator in supplemental valve opening position when said movable member is in main valve opening position.

5. In a valve mechanism: means forming a main valve; means forming a supplemental valve having a valve seat; a closure for the main valve; a closure for the supplemental valve seat; a manually movable member having a projection capable of connection with said supplemental valve closure to open said supplemental valve upon advancement of said manually movable member; a first contact carried by said manually movable member; a second member having a second contact; means mounting said second member on said movable member for limited relative movement with respect thereto, and normally spacing said contacts; and means dependent upon the closed position of said main valve to cause relative movement between said second member and said manually movable member upon advancement of said manually movable member for causing engagement of said contacts.

6. In a valve mechanism: means forming a main valve having a valve seat; means forming a supplemental valve having a valve seat; a closure for the main valve seat; a closure for the supplemental valve seat; an electromagnetically operated movable member connected to said main valve closure for moving said main valve closure to open position; a manually movable operator for moving said supplemental valve to open position; means biasing said operator toward supplemental valve closing position; a contact carried by said operator; a second member; means mounting said second member on said operator for limited relative movement with respect thereto; a contact carried by said second member; means biasing said second member toward one position on said operator in which said contacts are spaced; and means dependent upon the closed position of said main valve to cause relative movement between said second member and said operator upon advancement of said operator to cause engagement of said contacts.

7. In a valve mechanism: a main valve including a main valve closure; a supplemental valve including a supplemental valve closure; an operator for moving the main valve closure to open position; a manually movable operator for moving the supplemental valve closure to open position, including a first plate having a projection operating said supplemental valve closure upon advancement of said first plate; means biasing said manually movable operator toward supplemental valve closing position; a second plate carried by said first plate; means mounting said second plate for movement with said first plate and for limited movement with said respect thereto; a pair of contacts carried respectively by said first and second plates; means biasing said plates for spacing said contacts; means carried by said main valve operator forming an abutment interposed in the path of movement of said second plate when said main valve operator is in main valve closing position to cause relative movement of said plates for engaging said contacts upon advancement of said manually movable operator; means forming a latching recess on said first plate; and a latching projection carried by said main valve operator and engageable with said latching recess upon opening of said main valve when said plate is in supplemental valve opening position.

8. In a valve mechanism: a main valve including a main valve closure; a supplemental valve including a supplemental valve closure; an operator for the main valve; a manually movable operator for the supplemental valve including a first plate having a projection operating said supplemental valve closure upon advancement of said first plate; means biasing said manually movable operator toward supplemental valve closing position; a second plate carried by said first plate; means guiding said second plate for relative sliding movement with respect to said first plate; a pair of contacts carried respectively by said plates; resilient means urging said second plate toward a position in which said contacts are spaced; means dependent upon the closed position of said main valve operator forming an obstacle in the path of movement of said second plate to cause relative sliding movement of said plates upon advancement of said manually movable operator to cause said contacts to engage; and a latching mechanism for holding said first plate in supplemental valve opening position including a latching projection carried by said main valve operator operable upon opening of said main valve.

9. In a valve mechanism: a main valve including a main valve closure; a supplemental valve including a supplemental valve closure; a pair of relatively slidable plates movable together; an operator secured to one of said plates; one of said plates operating said supplemental valve closure to move said supplemental valve closure to open position upon advancement of said operator; means biasing said relatively slidable plates toward one relative position; a circuit controller operated by relative positioning of said slidable plates against said biasing means; and means dependent upon the closed position of said main valve to cause relative movement of said relatively slidable plates upon advancement of said operator.

10. In a valve mechanism: a first valve structure having a valve seat; a second valve structure having a valve seat; movable closures respectively for said seats; a manually movable member having a projection capable of connecting with said first valve closure to open said first valve closure upon advancement of said manually movable member; a first contact carried by said manually movable member; a second member having a second contact; means mounting said second member for movement normally with said manually movable member and for limited movement with respect thereto, said mounting means normally spacing said contacts; and abutment means effective only while the said second valve structure is in closed position to close said contacts upon advancement of said manually movable member.

11. In a valve mechanism: a first valve structure having a seat; a second valve structure having a seat; movable closures respectively for said structures; a pair of relatively slidable plates movable together; an operator secured to one of said plates; one of said plates being capable of connecting with said first valve closure to move said first valve closure to open position upon advancement of said operator; means biasing said relatively slidable plates toward one relative position; a circuit controller operated by relative positioning of said slidable plates against said biasing means; and abutment means effective only while said second valve structure is in closed position to cause relative movement of said relatively slidable plates upon advancement of said operator.

12. In a valve mechanism: a first valve structure; a second valve structure; each of said structures having a valve seat as well as a movable closure for the seat; a movable member coupled to one of the closures to move the said one closure to open position; an electromagnet; a movable magnetic element moved by the electromagnet and coupled to the other valve closure for moving the other valve closure to valve opening position; and means operated by the element only upon movement of said element to attracted position for latching said member in valve opening position.

13. In a valve mechanism: a first valve structure; a second valve structure; each of said structures having a valve seat as well as a movable closure for said seat; a movable member coupled to one of the closures to move the said one closure to open position; electromagnetic means for moving the other valve closure to valve opening position; a circuit controller operated in response to the movement of said movable member to valve opening position and dependent upon the closed position of said other valve closure; and means operated by the electromagnet upon movement of the other valve closure to open position for latching said member in valve opening position.

14. In a valve mechanism: a first valve structure; a second valve structure; each of said structures having a valve seat as well as a movable closure for said seat; a movable member coupled to one of the closures to move the said one closure to open position; electromagnetic means for moving the other valve closure to valve open position and a circuit controller operated in response to the movement of said movable member to valve opening position and dependent upon the closed position of said other valve closure.

15. A valve mechanism: means forming a main valve; means forming a supplemental valve having a valve seat; a closure for the main valve; a closure for the supplemental valve seat; a manually movable member having a projection capable of connection with said supplemental valve closure to open said supplemental valve upon advancement of said manually movable member; a first contact carried by said manually movable member; a second member having a second contact; means mounting said second member on said movable member for limited relative movement with respect thereto and normally spacing said contacts; means dependent upon the closed position of said main valve to cause relative movement between said second member and said manually movable member upon advancement of said manually movable member for causing engagement of said contacts; means for moving the main valve closure to open position; and means dependent upon the open position of said main valve closure for latching said manually movable member in valve opening position.

References Cited in the file of this patent

UNITED STATES PATENTS

| Number | Name | Date |
|---|---|---|
| 2,011,824 | Pearson | Aug. 20, 1935 |
| 2,258,811 | Ray | Oct. 14, 1941 |
| 2,268,960 | Ray | Jan. 6, 1942 |
| 2,275,962 | Herbster | Mar. 10, 1942 |
| 2,276,015 | Brodbeck et al. | Mar. 10, 1942 |
| 2,333,261 | Mantz | Nov. 2, 1943 |
| 2,371,351 | Paille | Mar. 13, 1945 |
| 2,376,212 | Warren | May 15, 1945 |